Sept. 10, 1946.   M. R. WELLS   2,407,622
FUEL TANK
Filed Nov. 1, 1943
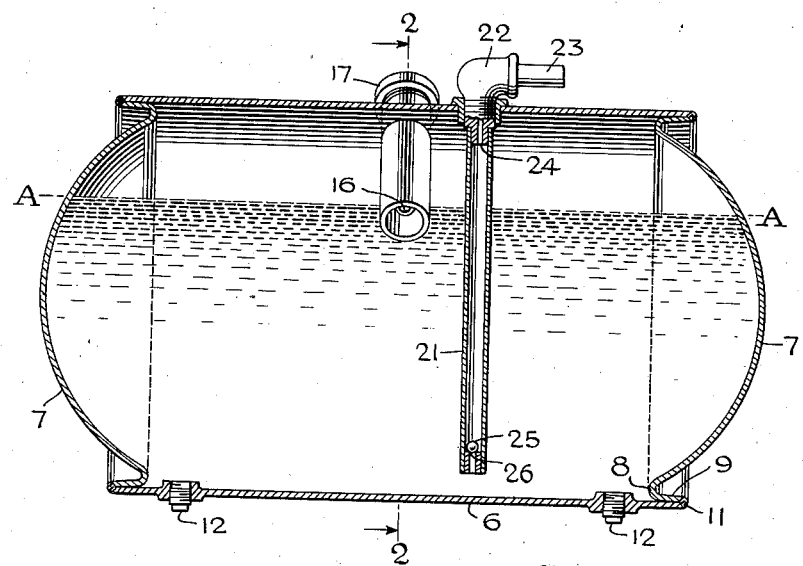
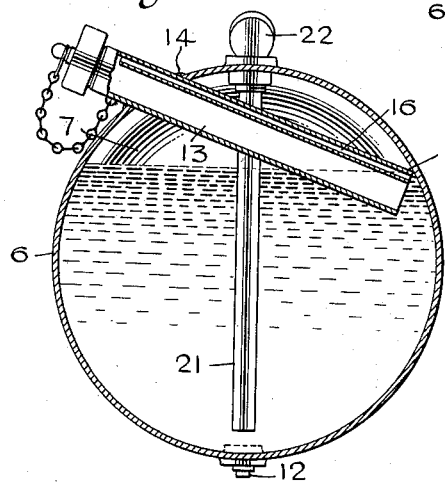
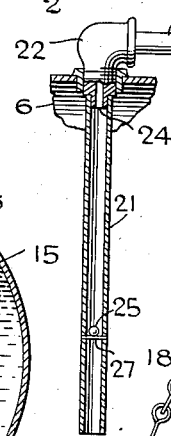
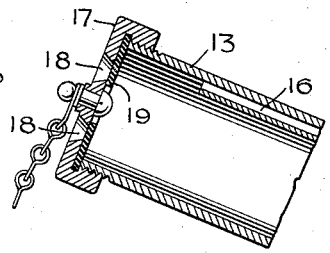
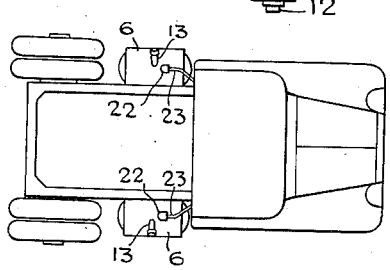
Inventor
Merritt R. Wells
Attorneys Patented Sept. 10, 1946

2,407,622

UNITED STATES PATENT OFFICE 2,407,622

FUEL TANK

Merritt R. Wells, York, Pa.

Application November 1, 1943, Serial No. 508,589

2 Claims. (Cl. 220—86)

This invention relates to tanks for carrying combustible liquids on vehicles, and more particularly to gasoline tanks for trucks, tractors and other commercial motor vehicles.

While capable of employment in various different forms the invention will be described as embodied in a cylindrical tank intended to be mounted with its axis normally horizontal, and approximately parallel with the longitudinal axis of the vehicle.

This relationship is important because the tank is designed to protect against discharge of liquid or vapor in the event that the vehicle rolls on its side as the result of accident. The arrangement is also such as to give reasonable protection against outflow when the tank is tilted in a fore and aft direction. Since extreme tilting forward or back rarely occurs, even in accidents, the tank meets the actual practical requirements in this regard.

Additional protective features not claimed herein are valved protection of the fuel line, a vented filling cap which seals against outflow of liquid or vapors but will rupture or yield to prevent the development of extreme bursting pressures; a tank shell construction which will permit considerable volume-increasing or other distortion of the tank without seam rupture, as well as other features which will become clear as the description proceeds.

An outstanding feature of commercial importance is extreme simplicity of form despite the incorporation of important safety features.

In the drawing:

Fig. 1 is a vertical axial section of the tank.

Fig. 2 is a transverse section on the line 2—2 of Fig. 1.

Fig. 3 is an enlarged axial section through the capped end of the filling tube.

Fig. 4 is a diagrammatic plan indicating a typical position of the tank relatively to the vehicle.

Fig. 5 is a view illustrating a modified form of dip pipe.

The tank comprises a cylindrical shell 6 with outwardly convex spheroidal heads 7. Each head is flanged outward on a rather long radius at 8 to form a deep flange 9 which is welded at its margin 11 to the shell 6. If the tank is crushed, and internal pressure is thus developed, the heads may readily distort to increase the tank volume and thus relieve excessive internal pressures without rupture. Distortion of the heads may serve to relieve excessive internal pressure however developed.

Drain plugs are indicated at 12 and may be variously located.

The filling connection comprises an inclined, and preferably straight tube which passes through the cylindrical wall of the tank at one side near the top and terminates near the cylindrical wall at the other side of the tank and at a somewhat lower level. It is located at substantially midlength of the tank and is welded to the shell at 14 to produce a tight joint. It may be welded to the shell 6 at 15 if desired. An air vent duct 16 is formed within the upper portion of the tube 13, by any suitable means, and extends from the inner, nearly to the outer end of filling tube 13. This segregated vent passage is desirable but not indispensable and no novelty is claimed for it.

Threaded or otherwise removably fixed on the end of tube 13 is a filling cap 17, having one or more vents 18, two being illustrated. These vents are normally closed by an annulus 19 of a rubberlike plastic of a type not harmfully affected by the liquid in the tank. The annulus 19 serves at its outer margin as a gasket between the cap 17 and the end of tube 13. The inner portion serves as a valve, opening to permit inward flow of air and closing to prevent outward flow of liquid or vapor.

The annulus 19 although it closes against outflow also serves as a rupturable relief plug. Upon development of high internal pressure in the tank and before dangerous pressures are developed the edge of the annulus will blow through the ports 18 and gradually relieve excessive pressure.

The annulus 19 performs still another useful function. It defines an air inlet passage to the tank interior, so thin and so close to the metal of the cap, that propagation of flame through the vent passage is inhibited.

The tube 13 is located substantially at midlength of the tank and close to it is the fuel offtake connection. This last comprises a dip pipe 21 which extends vertically downward nearly to the bottom of the tank. An elbow 22 sealed in an opening in the top of the tank connects the dip pipe to fuel line 23 which extends to any point of use, such as the fuel feed pump or the carburetor of an engine.

On the lower end of the elbow 22 and within pipe 21 is a downwardly facing valve seat 24 which may be sealed by a ball valve 25 smaller than the bore of pipe 21. This valve is normally far removed from seat 24 and rests on an upwardly facing lower seat 26 at the lower end of pipe 21. The function of this seat 26 is to protect against cross flow between two tanks when two tanks are connected to a single fuel line, an arrangement sometimes used.

When the seat 26 is not needed, a cross pin 27 may be used to retain the valve as indicated in Fig. 5. The seat 26 does no harm even when not needed, and is commonly provided.

Functional characteristics

In the drawing the maximum liquid level is indicated at A—A. This of course is the level at which the liquid seals the vent passage 16. The effect is to maintain an air space in the tank above the liquid. This affords some cushioning action in the event that the tank is crushed even when nearly full. This and the fact that the head 7 may be greatly deformed or distended as above described affords protection against rupture of the tank by crushing.

If the filling cap 17 is in place the annulus 19 serves as a valve and prevents escape of liquid or vapor through the filling connection. This is effective against gravity flow and even against moderate internal pressures regardless of the position of the tank. The filling tube 13 gives effective protection against escape of liquid from the tank even if the cap 17 be left off.

If the vehicle rolls to either side one or the other end of the tube 13 will be above the liquid level in the tank so that little or no liquid will escape and the fire hazard will thus be minimized. It is not intended that the cap 17 be left off, but that is a contingency which must be considered as possible.

Quite marked tilting of the tank either in a forward or rearward direction with reference to the vehicle will not cause escape of the fuel through the filling tube 13 even if the cap 17 be left off and even though the tank be substantially filled. This effect is even more marked as the liquid level lowers, and when the tank is slightly less than half full, no liquid at all would escape if the tank were stood on end.

Figure 4 is a plan view of a tractor vehicle showing a possible location of the tank. Others may be used, and will afford the maximum protection which the tank is designed to afford if the axis extends horizontally and in a fore and aft direction.

The normal rate of outflow of fuel through the fuel line 23 is small and is insufficient to lift the ball check valve 25 to the upper seat 24. It is desirable that the mass and dimension of the ball be such relatively to the normal rate of outflow that the ball will be lifted to the upper seat by an outflow rate only moderately in excess of normal. With the part so designed even a momentary excess flow caused by a broken fuel line or any other abnormal condition will carry the ball to the seat 24 where it will close the fuel line against further outflow.

Any tipping of the tank from its normal position has the effect of lowering the rate of flow required to lift the ball 25. If the tank is tipped to an angle of more than ninety degrees in any direction, the ball valve will roll to seat 24 irrespective of any flow that might occur. The important thing however is the design of the ball in such a way that rate of flow is the controlling factor in its motion towards the seat 24.

The action of the sealing annulus 19 as an inlet air valve and as a combined check and relief valve has already been explained.

The construction illustrated has outstanding advantages. The tank has a simple cylindrical shell with spheroidal heads of stable form. Despite their stability these heads are capable of yielding in case of the development of dangerous internal pressures without entailing rupture of the tank. The filling tube is a simple straight tube which can be manufacturing inexpensively. The same is true of the dip pipe. Thus careful location and coordination of the filling tube and the dip pipe give substantial protection in the event of accident without requiring complicated forms or difficult manufacturing procedures.

While the invention is intended for use as a fuel tank designed to carry volatile fuels, it can be used for other purposes, particularly on vehicles, and in such use will offer some or all of the advantages above outlined.

What is claimed is:

1. The combination of an elongated fuel tank adapted to be mounted on a vehicle with its longitudinal axis extending substantially horizontally; and a filling tube projecting into the interior of said tank, the tube being mounted in an inclined position with its axis substantially in the vertical plane which bisects said longitudinal axis at right angles thereto, said tube when viewed in plan extending substantially from side to side of the tank, and the lower inner end thereof lying in said plane and opening into the tank at a height such as to trap a substantial air volume in the upper portion of the tank when the latter is filled with liquid fuel supplied through the tube.

2. A safety filling connection for vehicle fuel tanks, comprising in combination with such a tank adapted for mounting on a vehicle in a fixed position, an inclined filling tube located in a substantially vertical plane at right angles to and approximately bisecting the fore-and-aft dimension of the tank, said tube entering through and being sealed to the upper wall of the tank, and extending thence with a moderate downward inclination nearly to a side wall of the tank, the lower end of said tube opening into the tank in said vertical plane and at a height such as to trap a substantial air volume in the upper portion of the tank when the latter is filled with liquid fuel supplied through the tube.

MERRITT R. WELLS.